US006256003B1

(12) United States Patent
Tsuchiya et al.

(10) Patent No.: US 6,256,003 B1
(45) Date of Patent: *Jul. 3, 2001

(54) JITTER CORRECTION CIRCUIT AND A FLAT PANEL DISPLAY DEVICE USING THE SAME

(75) Inventors: Kenshi Tsuchiya; Hirofumi Kato; Hiroyoshi Murata, all of Hyogo-ken (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,954

(22) Filed: Jan. 14, 1998

(30) Foreign Application Priority Data

Jan. 14, 1997 (JP) ..................................... 9-004902
Sep. 16, 1997 (JP) ..................................... 9-250248

(51) Int. Cl.[7] ................................................ G09G 3/36
(52) U.S. Cl. ............................ 345/87; 345/204; 348/497
(58) Field of Search ............................... 345/30, 87, 204; 343/497–499; 370/516–519; 375/226, 371–376

(56) References Cited

U.S. PATENT DOCUMENTS

| 4,623,925 | * | 11/1986 | Tults ..................................... 358/183 |
| 4,821,297 | * | 4/1989 | Bergmann et al. ................... 375/120 |
| 4,872,065 | * | 10/1989 | Isono et al. ........................... 358/494 |
| 4,987,491 | * | 1/1991 | Kaite et al. ........................... 358/166 |
| 5,206,726 | * | 4/1993 | Okuda .................................. 358/149 |
| 5,825,939 | * | 10/1998 | Kawasaki et al. ................... 382/270 |
| 5,923,377 | * | 7/1999 | Kenmochi et al. .................. 348/497 |

* cited by examiner

Primary Examiner—Bipin Shalwala
Assistant Examiner—Jimmy H Nguyen
(74) Attorney, Agent, or Firm—Oblon, Spivak, McClelland, Maier & Neustadt, P.C.

(57) ABSTRACT

A jitter correction circuit includes a delayed signal generator and an output circuit. A correction subject signal Ckd0 is derived from multiplying a horizontal synchronization signal or a reference signal Vref. The correction subject signal includes jitters. The delayed signal generator is provided with a plurality of delay elements Fd1 through Fdn which receive and delay the correction subject signal, respectively, by predetermined delay time to generate delayed signals Ckd1 through Ckdn. The output circuit outputs one of the correction subject signal Ckd0 and the delayed signals Ckd1 trough Ckdn on the condition that it has predetermined timing relationship with the reference signal Vref.

11 Claims, 9 Drawing Sheets

JITTER CORRECTION CIRCUIT AND A FLAT PANEL DISPLAY DEVICE USING THE SAME

BACKGROUND OF THE INVENTION

Field of the Invention

This invention relates to a jitter correction circuit and a flat panel display device provided with such a jitter correction circuit.

Flat panel display devices, such as liquid crystal display devices, have convenient features of thin thickness, light weight and low power consumption so that they have been widely used for image monitors in personal computers, word-processors and the like.

Many cathode ray tube (CRT) display devices are designed for displaying images in response to analogue video signals. The analogue video signals include sequential video signals indicative of brightness of pixels and vertical and horizontal synchronization signals. Where those video signals are applied to drive liquid crystal display devices, signal processing is indispensably performed to convert them into digital pixel data.

Figure 9:
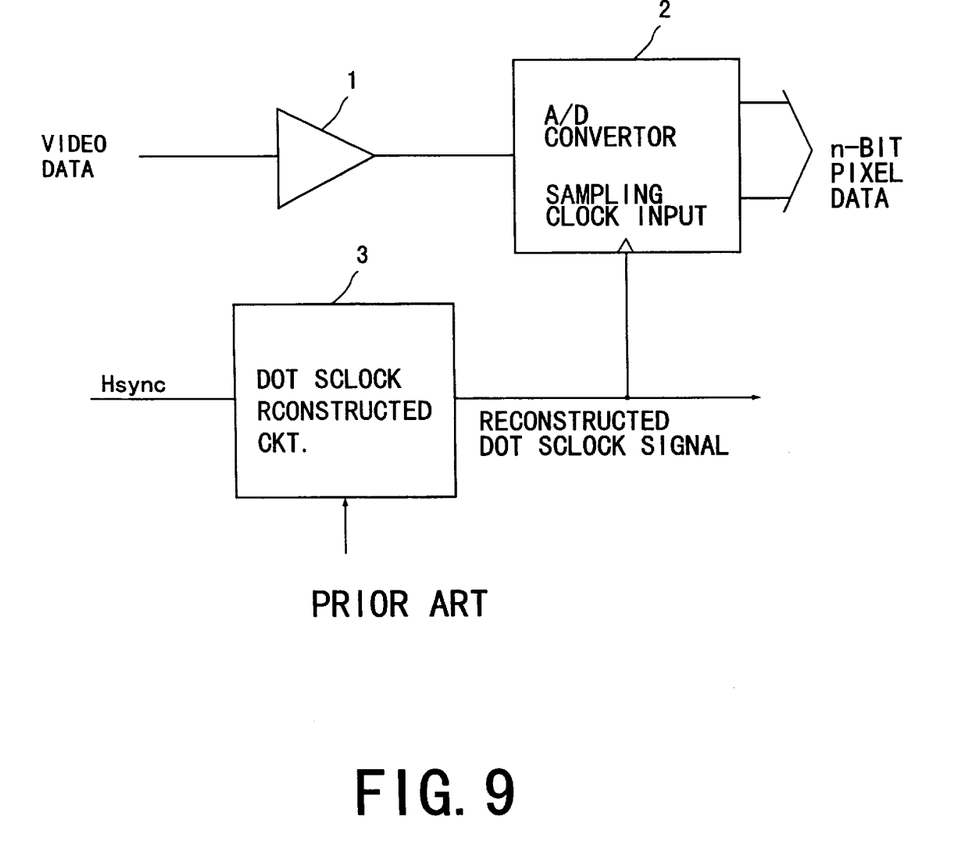
FIG. 9 is a block diagram of a conventional signal converter for a liquid crystal display device.

FIG. 9 is a block diagram of a signal conversion unit for processing such signals in a liquid crystal display device. An analogue video signal DATA1 with ordinarily 0.7 Vp-p (peak-to-peak voltage) is supplied to a signal amplifier circuit 1. This signal amplifier circuit 1 amplifies the video signal DATA1 to make it appropriate for an input level of an A/D converter circuit 2. The A/D converter circuit 2 converts the input video signal into a digital signal. This conversion is carried out in such a way that the video signal DATA1 is sampled in accordance with a dot clock signal reconstructed in a dot clock reconstruction circuit 3 as a sampling clock signal and that a pixel data is generated in response to every sampled level. The reconstructed dot check signal is synchronous with timing indicative of brightness at every pixel based upon the video signal DATA1. The dot clock signal is reconstructed from a horizontal synchronization signal Hsync, for instance, in the dot clock reconstruction circuit 3.

This dot clock reconstruction circuit 3 generally consists of a phase locked loop (PLL) circuit provided with a phase comparator, a loop filter, a voltage controlled oscillator and a divider. The voltage controlled oscillator provides an output signal which frequency and phase are controlled to be synchronous with the horizontal synchronization signal. The output signal is applied to the PLL circuit. The divider divides an output signal from the PLL circuit. The phase comparator compares the phase of an output signal of the divider circuit with that of the horizontal synchronization signal and detects error components. The loop filter eliminates unnecessary components and noises contained in an output signal from the phase comparator. At the same time, the loop filter also determines entire response characteristics of the PLL circuit. The voltage controlled oscillator is controlled in accordance with an output voltage of the loop filter. The output signal from the divider circuit is synchronized with the horizontal synchronization signal but it is not available to cause frequency and phase shifts with respect to the horizontal synchronization signal Hsync. The shifts occur at random and affect the reconstructed dot clock signal supplied from the dot clock reconstructed circuit 3 to the A/D conversion circuit 2 as the sampling clock signal. They result in jitters which randomly shift sampling timing of the video signal.

Figure 10:
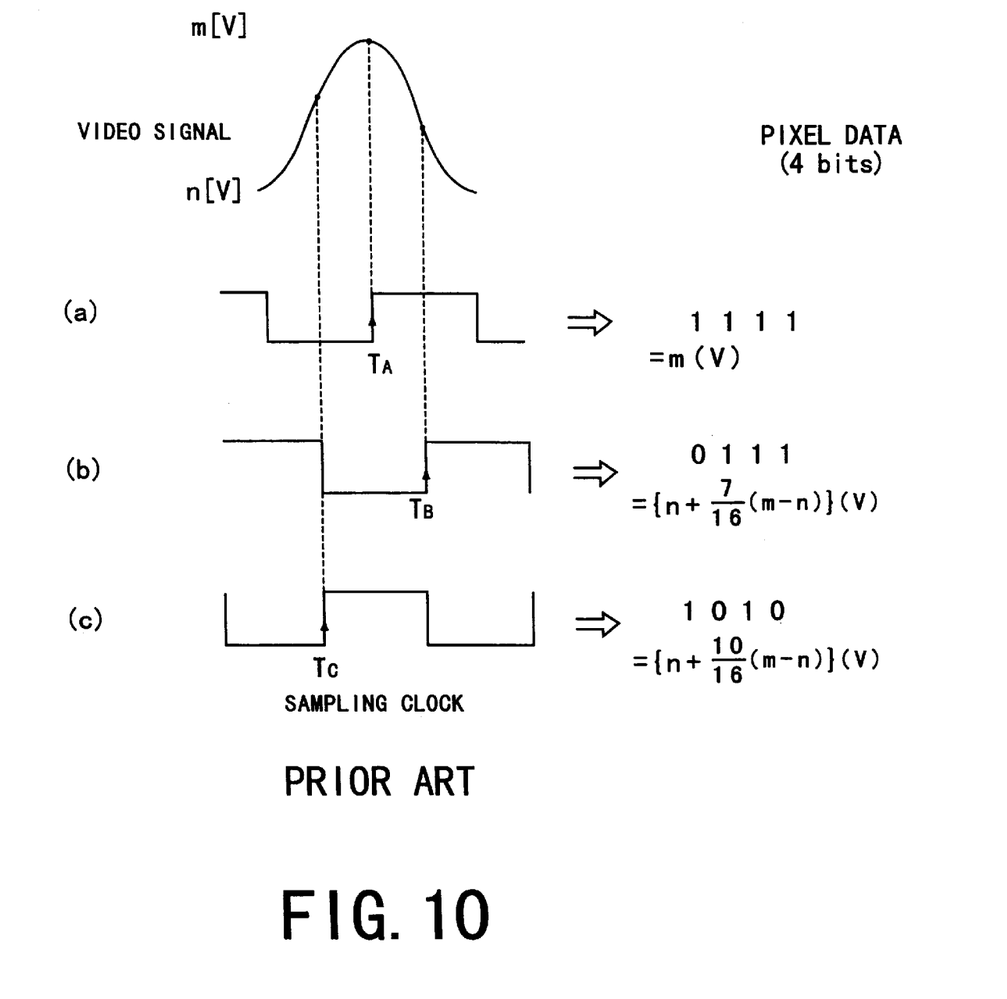
FIG. 10 shows the relationship between sampling timing and pixel data generated by an A/D converter described in FIG. 9 in which a video signal is sampled.

The relationship between pixel data derived from sampling of the video signal and sampling timing will be explained with reference to FIG. 10. Here, it is supposed that the video signal voltage varies between n[V] and m[V] and that pixel data are expressed by 4 bits. FIG. 10(a) shows that a sampling clock signal rises up at ideal sampling timing TA with respect to the video signal. This sampling timing is consistent with the center of each period of the video signal corresponding to each pixel. When the video signal voltage is m[V] at the sampling timing TA, this voltage is properly recognized and converted into pixel data of "1111".

Where the sampling clock signal, however, rises up at timing shifted from the sampling timing TA due to jitters as shown in FIGS. 10(b) and 10(c), the video signal voltage is mistakenly recognized as a value different from m[V]. FIG. 10(b) shows that the sampling clock signal rises up at the timing TB which is delayed from the timing TA. In this case, the video signal voltage is regarded as $\{n+7(m-n)/16\}$ [V], for instance, which is smaller than m[V] and converted into pixel data of "0111". FIG. 10(c) indicates a case where the sampling clock signal rises up at the timing TC which is advanced from the timing TA. The video signal voltage is recognized as $\{n+10(m-n)/16\}$ [V] which is also smaller than m[V] and converted into pixel data of "1010".

SUMMARY OF THE INVENTION

The existence of jitters causes display images flickering or waving on a screen of a liquid crystal display device. One object of the present invention is to provide a jitter correction circuit which is capable of reducing jitters and sampling a video signal in proper timing and a flat panel display device to which such a jitter correction circuit is applied.

A jitter correction circuit according to a first embodiment according to the present invention includes a delayed signal generator, an edge detection circuit and an output circuit. The delayed signal generator receives a control signal with rising or falling edge as a correction subject signal, i.e., a signal to be corrected and generate a plurality of delayed signals by providing the correction subject signal with delays. The edge detection circuit detects edge from the correction subject signal at leading or trailing edges thereof and the delayed signals in response to a timing detection signal. The output circuit supplies a corrected control signal based upon the jitter components detected through the edge detection circuit.

According to a second embodiment of the present invention, the delayed signal generator receives the correction subject signal which is generated by multiplying a reference signal and which includes jitters, and generates from the same a plurality of delayed signals, each of which is delayed in a predetermined period with respect thereto. The output circuit selectively outputs an output signal on condition that one of the delayed signals is in such predetermined timing as being synchronous with the reference signal.

In the jitter correction circuit mentioned above, the timing of the output signal is determined in accordance with the delayed signals generated by the delayed signal generator so that the jitters included in the output signal is suppressed with in a predetermined range even in a case that a phase of the correction subject signal changes due to the jitters. As a result, the jitter correction circuit of the present invention can solve an unstable image display caused by the jitters.

The above-stated and other objects and technical features of the present invention will become apparent from the following description when taken with the accompanying

DESCRIPTION OF THE PREFERRED EMBODIMENT

A liquid crystal display device according to a first embodiment of this invention will be explained hereinafter with reference to the attached drawings.

Figure 1:
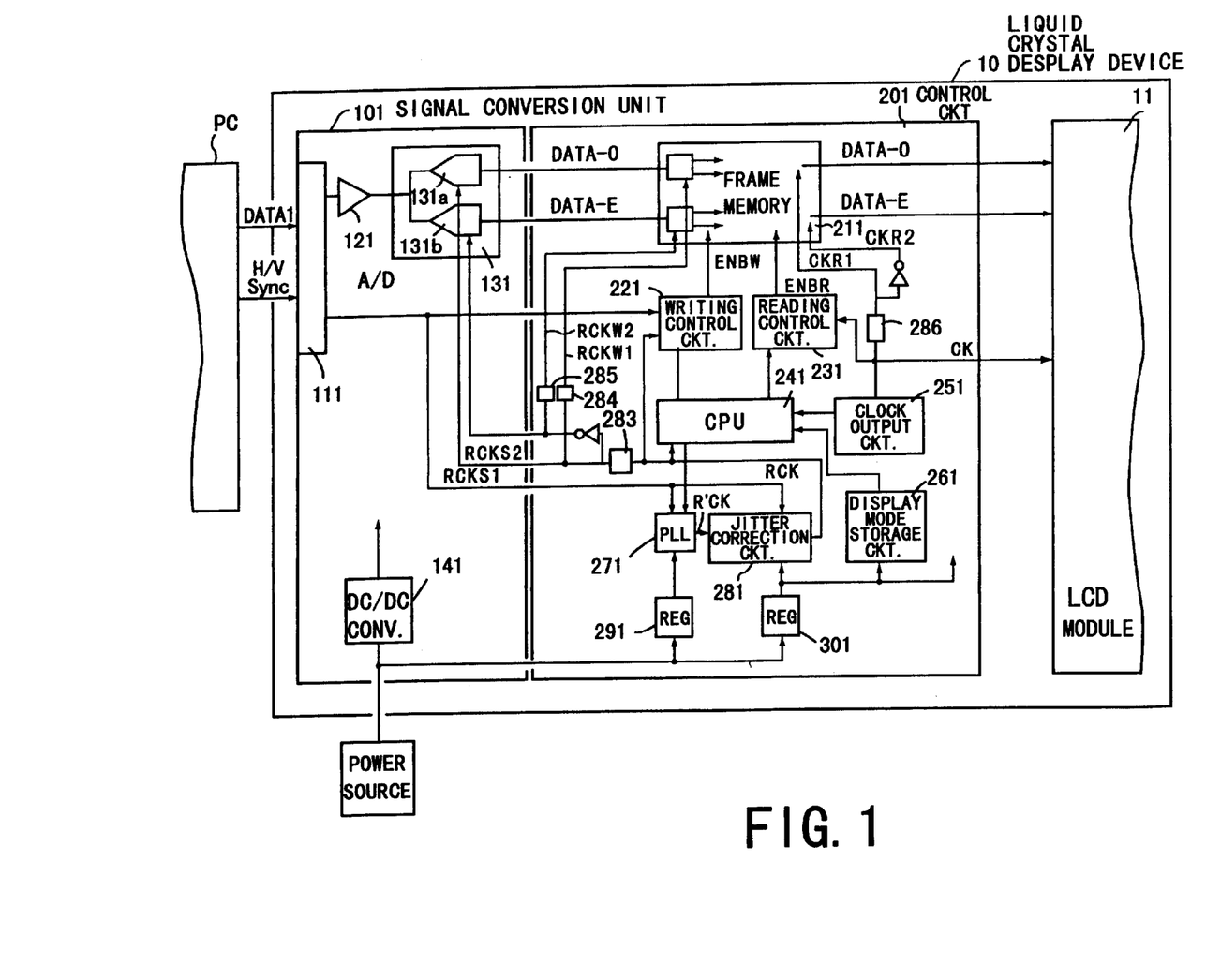
FIG. 1 is a circuit diagram of a liquid crystal display device according to a first embodiment of the present invention.

The liquid crystal display device 10 is driven by an analogue color video signal supplied from a personal computer PC as shown in FIG. 1. This color video signal consists of a video signal DATA1 and horizontal and vertical synchronization signals Hsync and Vsync. The liquid crystal display device 10 is provided with a signal converter 101, a control circuit 201, and a liquid crystal display module 11 in compliance with the XGA specification of 1024×786 color dots. The signal converter 101 carries out signal processing to convert the video signal DATA1 into digital pixel data DATA-O and DATA-E assigned to odd and even pixel numbers of the video data DATA1, respectively. The control circuit 201 provides the liquid crystal display module 11 with a 50 MHz clock signal CK suitable for the specification and the pixel data DATA-O and DATA-E obtained from the signal converter 101 in response to the timing of the clock signal CK. The liquid crystal display module 11 displays images based on the clock signal CK and the pixel data DATA-O and DATA-E.

Figure 2:
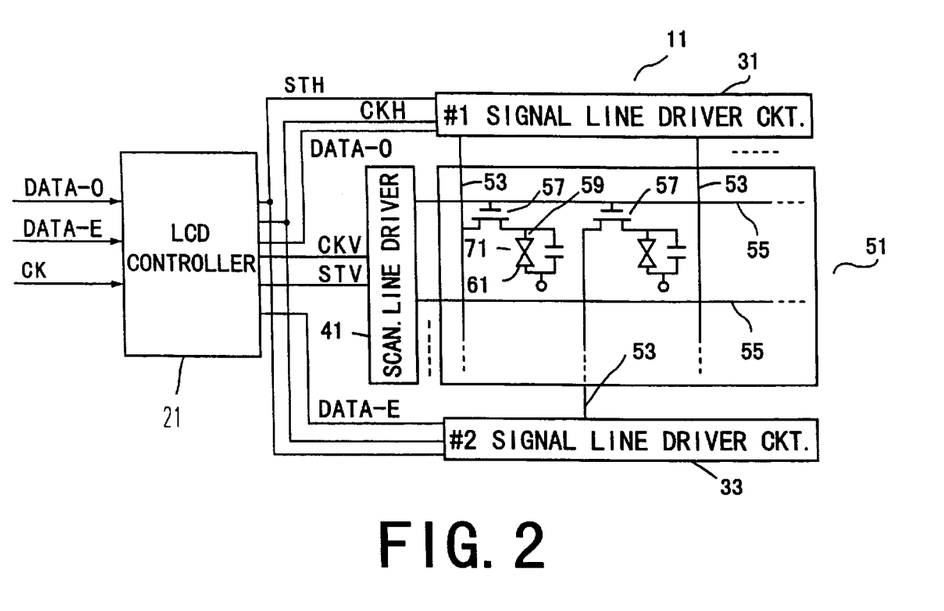
FIG. 2 is a circuit diagram of a liquid crystal display module shown in FIG. 1.

The liquid crystal display module 11 includes a liquid crystal display controller 21, a first signal line driver circuit 31, a second signal line driver circuit 33, a scanning line driver circuit 41 and a liquid crystal display panel 51.

The liquid crystal display panel 51 consists of an array substrate, a counter substrate, and a liquid crystal layer 71 held between the array and counter substrates. The array substrate includes 1,024×3 (for red, green and blue colors) signal lines 53, 768 scanning lines 55, 768×1,024×3 (=RGB) thin film transistors (TFTs) 57, and 1,024×3×768 pixel electrodes 59 formed on a glass plate (substrate). Those pixel electrodes 59 are defined in the form of a matrix array of 768 rows X (1,024×3) columns. The 768 scanning lines 55 are made along the lines of the pixel electrodes 59 while the 1,024×3 signal lines 53 along the columns thereof. Each TFT 57 is disposed in the vicinity of a crossing point where each scanning line 55 intersects each signal line 53. When the TFT 57 is selected in response to a gate signal applied through the scanning line 55, a signal voltage of the signal line 53 is supplied to a pixel electrode 59 through the TFT 57. The counter substrate includes counter electrodes 61 and color filter layers formed on a glass plate (substrate). The color filter layers consist of red, green and blue color stripes disposed in parallel with the column of the pixel electrodes 59. The liquid crystal layer 71 is coupled with an alignment layer covering the surfaces of the array and counter substrates, respectively. A screen on the liquid crystal panel 51 consists of 1,024×3 color (red, green and blue) dots and its diagonal length is set to be 21 inches, for instance.

The first signal line driver 31 includes driver integrated circuits, outputs signal voltage corresponding to the pixel data DATA-O for each horizontal scanning period (H) and provides the same to odd number signal lines 53 in the liquid crystal display panel 51. The second signal line driver 31 also includes driver integrated circuits, outputs signal voltages corresponding to the pixel data DATA-E for each horizontal scanning period (H) and provides the same to even number signal lines 53 in the liquid crystal display panel 51. The scanning line driver 41 provides a scanning pulse for each horizontal scanning period (H) to its corresponding scanning line 55.

The liquid crystal display devices controller 21 generates a 25 MHz horizontal clock signal CKH, a horizontal start signal STH, a vertical clock signal CKV and a vertical start signal STV in response to the pixel data DATA-O and DATA-E, and the clock signal CK supplied from the control circuit shown in FIG. 1. The pixel data DATA-O, the horizontal clock signal CKH, and the horizontal start signal STH are provided to the first signal driver circuit 31. The pixel data DATA-E, the horizontal clock signal CKH, and the horizontal start signal STH are provided to the second signal driver circuit 33. The vertical clock signal CKV and the vertical start signal STV are provided to the scanning line driver circuit 41.

The structure of the signal converter 101 will be explained. This signal converter 101 includes an interface unit 111, a signal amplifier circuits 121, an analogue-to-digital (A/D) converter 131, and a DC/DC converter 141. The interface unit 111 receives the video signal DATA1, and the horizontal and vertical synchronization signals Hsync and Vsync contained in the analogue video signal supplied from the personal computer PC. The horizontal and vertical synchronization signals Hsync and Vsync are supplied from the interface unit 111 to the control circuit 201. The video signal DATA1 is provided to the A/D converter 131 through the signal amplifier circuit 121. The amplifier circuit 121 amplifies the video signal DATA1 and makes the same suitable for an input level of the A/D converter 131. The A/D converter 131 is provided with first and second A/D converter circuits 131a and 131b to convert a video signal supplied from the signal amplifier circuit 121 into digital signals. The first and second A/D converter circuits 131a and 131b sequentially sample the video signal DATA1 to obtain 8-bit pixel data DATA-O and DATA-E assigned to odd and even number pixels, respectively.

In the event that the video signal DATA1 is the VGA mode (60 Hz) for color display of 640×480 dots, the horizontal synchronization signal Hsync is set to be 31.5 KHz in frequency and negative in polarity while the vertical synchronization signal Vsnc 60 Hz in frequency and negative in polarity.

Judging from the frequency and polarity of the horizontal and vertical synchronization signals Hsync and Vsync that the video signal DATA1 is the VGA (60 Hz) mode, for example, the first and second A/D converter circuits 131a and 131b carry out sampling operations based upon a (25.175)/2 MHz first sampling signal RCKS1 derived from dividing by 2 in a divider circuit 283 a 25.175 MHz reconstructed dot clock signal supplied from a jitter correction circuit 281, and a second sampling signal RCK82 derived from reversing in polarity the first sampling signal RCKS1.

The first and second sampling signals are different in phase from each other by 180°. With the structure of the first and second A/D converter circuits 131a and 131b, the A/D converter 131 substantially operates at lower speed and is capable of performing a stable A/D conversion.

The DC/DC converter 141 converts a D.C. voltage of 12 [V] supplied from an outside power source into a D.C. voltage of ±5 [V]. The signal amplifier 121 and the A/D converter 131 are energized with the D.C. voltages from the DC/DC converter 141.

Next, the control circuit 210 is explained. The control circuit 201 is provided with a frame memory 211, a writing control circuit 221, a reading control circuit 231, a central processor unit (CPU) 241, a clock output circuit 251, a display mode storage circuit 261, a PLL circuit 271, a jitter correction circuit 281, a first regulator circuit 291, and a second regulator circuit 301.

The display mode storage circuit 261 includes a ROM which stores a plurality of display mode data indicative of frequencies of the horizontal and vertical synchronization signals Hsync and Vsync for various display modes. The CPU 241 detects the frequencies and the polarization of the horizontal and vertical synchronization signals Hsync and Vsync, compares them with the display mode data stored in the display mode storage circuit 261, and identifies a display mode from a result of the comparison. If the horizontal and vertical synchronization signals Hsync and Vsync are 31.5 KHz and 60 Hz in frequency, respectively, and negative in polarity, for instance, then the display mode is identified as the VGA (60 HZ) mode from the mode data indicative of those frequencies as mentioned above. Further, where the horizontal and vertical synchronization signals Hsync and Vsync are 37.88 KHz and 60 Hz in frequency, respectively, and positive in polarity, the display mode is recognized as the SVGA (56 Hz) mode. Still further, where the horizontal and vertical synchronization signals Hsync and Vsync are 48.36 KHz and 60 Hz in frequency, respectively, and negative in polarity, the display mode is detected as the XGA (60 MHz) mode.

The CPU 241 outputs a control signal to the PLL circuit 271 in response to a result of the identification. The PLL circuit 271 multiplies the horizontal synchronization signal Hsync, makes the same suitable for the frequency of a display mode in accordance with the control signal from the CPU 241, and outputs it as the reconstructed dot clock signal RCK. In the case that the display mode is identified as the VGA (60 Hz) mode as mentioned above, the horizontal synchronization signal Hsync is multiplied to obtain the 25.175 MHz reconstructed dot clock signal RCK. Although, in this embodiment, the reconstructed dot clock signal RCK is generated by multiplying the horizontal synchronization signal in the PLL circuit 271, the clock signal RCK may also be obtained by multiplying the vertical synchronization signal Vsync or other reference signals. It is preferable to multiply the horizontal synchronization signal Hzync because it can generate a clock signal with high accuracy and does not increase the size of a circuit. Other circuits than a PLL circuit, such as a delay looked loop (DLL) circuit, may be used to multiply the reference signal. Further, a much higher frequency reference signal may be divided. Since the reconstructed dot clock signal RCK unavoidably includes line-to-line jitters, the jitter correction circuit 281 corrects the jitters based upon the horizontal and vertical synchronization signals Hsync and Vsync and the signal corrected thereby is provided to each circuit.

The frame memory 211 has a (1,024×3×768)×8-bit memory area where the pixel data DATA-O and DATA-E from the signal converter 101 are stored at each timing of [(25.175)/4] Hz first and second writing clock signals RCKW1 and RCKW2 which are derived from dividing by 2 in divider circuits 284 and 285 the first and second sampling signals RCKS1 and RCKS2 based on the reconstructed dot clock signal RCK. Writing addresses for the pixel data DATA-O and DATA-E are determined by a writing enabling signal ENBW generated in the writing control circuit 221 in accordance with the horizontal and vertical synchronization signals Hsync and Vsync, the reconstructed dot clock signal RCK, and the control signal a display mode supplied from the CPU 241.

The pixel data DATA-O and DATA-E are read out from the frame memory 211 at each timing of a 25 MHz first reading clock signal CKR1 and a second reading clock signal CKR2 which is a reversed output of the clock signal CKR1. The clock signal CKR1 is derived from dividing by 2 in a divider circuit 286 a clock signal from a clock output circuit 251 which generates a 50 MHz clock signal to comply with the XGA specification of the liquid crystal display module 11. Reading addresses for the pixel data DATA-O and DATA-E are determined by horizontal and vertical direction reading enable signals ENBRH and ENABRV generated in the reading control circuit 231 in accordance with the clock signal CK and the control signal corresponding to a display mode supplied from the CPU 241. The clock output circuit 251 generates the 50 MHz clock signal CK to comply with the XGA specification of the liquid crystal display module 11 according to this embodiment but may also generate a 65 MHz clock signal, instead. Where the specification of the liquid crystal display module 11 is the SVGA of (800×600) color dots, a 40 MHz clock signal CK is outputted. Where it is the VGA of (640×480) color dots, a 25 MHz clock signal is outputted. In order to comply with each specification, the clock output circuit 251 may be set in advance to generate a plurality of clock signals CK.

Figure 3:
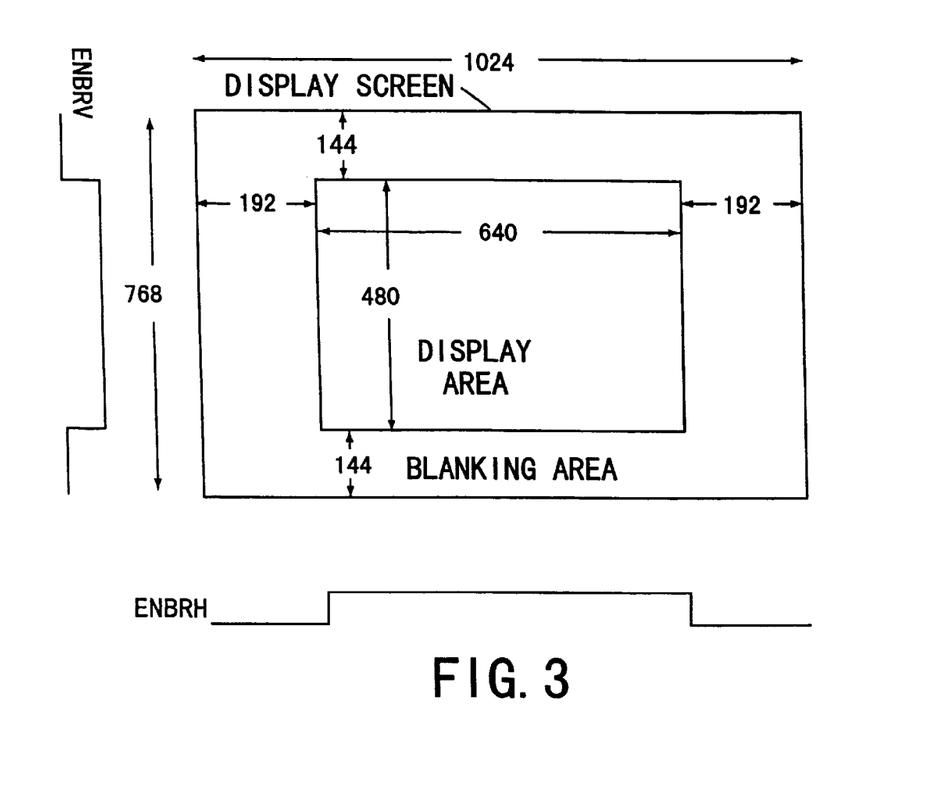
FIG. 3 shows display and non-display areas provided on a screen of the display module shown in FIG. 2.

In further detail, those pixel data DATA-O and DATA-E are read out in accordance with addresses successively designated during a period of time to keep the reading enabling signal ENBR supplied from the reading control circuit 231 high in level. Where, without enlarging or reducing the VGA mode (60 Hz) images, the liquid crystal display module 11 displays in compliance with the XGA specification according to the present embodiment, for example, it is necessary to provide a display screen with 144-dot and 192-dot blanking areas at its upper and lower parts, and its left and right parts, respectively. In the event that an effective display area is limited to the area surrounded by the blanking areas, the horizontal- and vertical-direction reading enable signals ENBRH and ENABRV are kept high in level to allow the reading operation during a period of time when reading addresses are designated for the effective display area. The horizontal- and vertical-direction reading enable signals ENBRH and ENABRV, however, are however, is kept low in level to prohibit any reading operation during a period of time when addresses are designated for the blanking area. During the reading prohibition period of time, specific data of "00000000" are provided to the liquid crystal display module 11 as pixel data of blanking dots and a black display is performed on the blanking dots. In this way, images of a display mode which display dots are less than the effective display area dots may be displayed in the center of the screen under the control of the horizontal- and vertical- direction enable signals ENBRH and ENABRV. According to this embodiment, the specific data of "00000000" is outputted to carry out the black display for the blanking dots during the period of time when the reading addresses are designated for the blanking area but other specific data may be used to provide the blanking dots with other than the black display.

Figure 4:
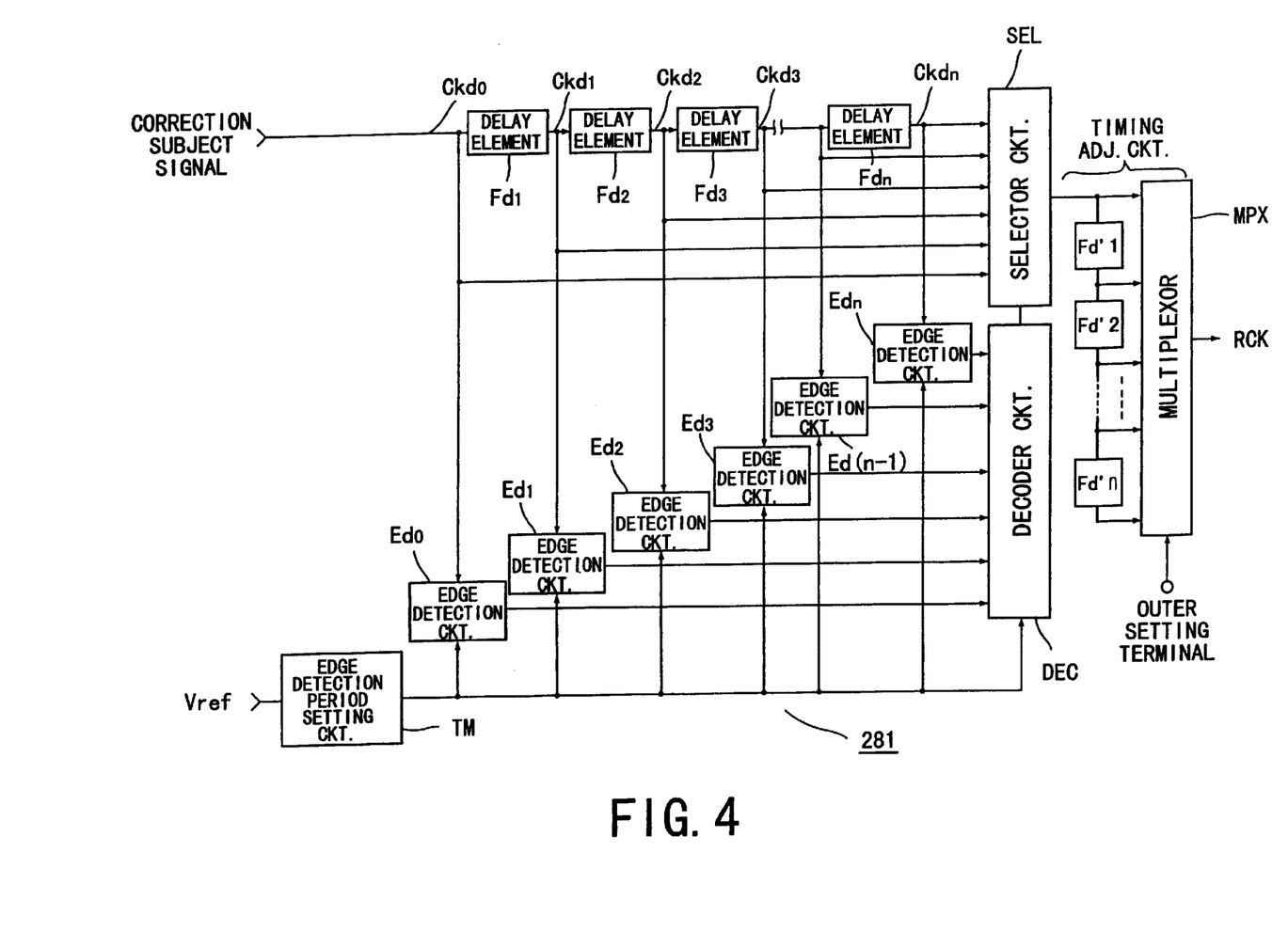
FIG. 4 is a block diagram of a jitter correction circuit.

The jitter correction circuit 281 according to this embodiment will be explained with reference to FIGS. 4 through 6 in greater detail.

The jitter correction circuit 281 derives the reconstructed dot clock signal R'CK from the output PLLout of the PLL circuit 271 through a buffer circuit (not shown). This reconstructed dot clock signal is used for a correction subject signal Ckd0. The jitter correction circuit 281 includes series circuits of n delay elements Fd1 through Fdn to delay the signal Ckd0, (n+1) edge detection circuits Ed0 through Edn to detect edges of the signal Ckd0 and delayed signals Ckd1 through Ckdn obtained from the delay elements Fd1 through Fdn, an edge detection period setting circuit TM to set edge detection periods based on the horizontal synchronization signal Hsync supplied as a reference signal Vref, a decoder DEC to decode output signals from the edge detection circuits Ed0 through Edn, and a selector circuit SEL to select one of the signals Ckd0 through Ckdn based on an output signal from the decoder DEC.

In this embodiment, (n) is set to be 15. The delay elements Fd1 through Fdn successively delay the signals Ckd0 and the delayed signals Ckd1 through Ckdn by delay time Td of 1 [ns], respectively. In this case, phase difference between the delayed signals Ckd1 through Ckdn and the signal Ckd0 are 1, 2, 3, . . . , n [ns], respectively.

The edge detection period setting circuit TM generates an output signal EMTG in synchronization with the horizontal synchronization signal Hsync which is supplied as the reference signal Vref. This output signal ETMG rises up and falls down after lapses of 8 [ns] and 10 [ns] from trailing edge timing of the horizontal synchronization signal Hsync (the reference signal Vref), respectively. The period of 2 [ns] between the leading and trailing edges is set as an edge detection period Tedj. The edge detection period setting circuit TM may set the edge detection period based on other reference signal than the horizontal synchronization signal Hsync, e.g., the vertical synchronization signal Vsync. It is preferable, however, to set the edge detection period based on the horizontal synchronization signal Hsync because it is repeatedly controllable for a short period of time. The edge detection circuits Ed0 through Edn detect edges of the signal Ckd0 and the delayed signals Ckd1 through Ckdn during the edge detection period Tedj.

Figure 5:
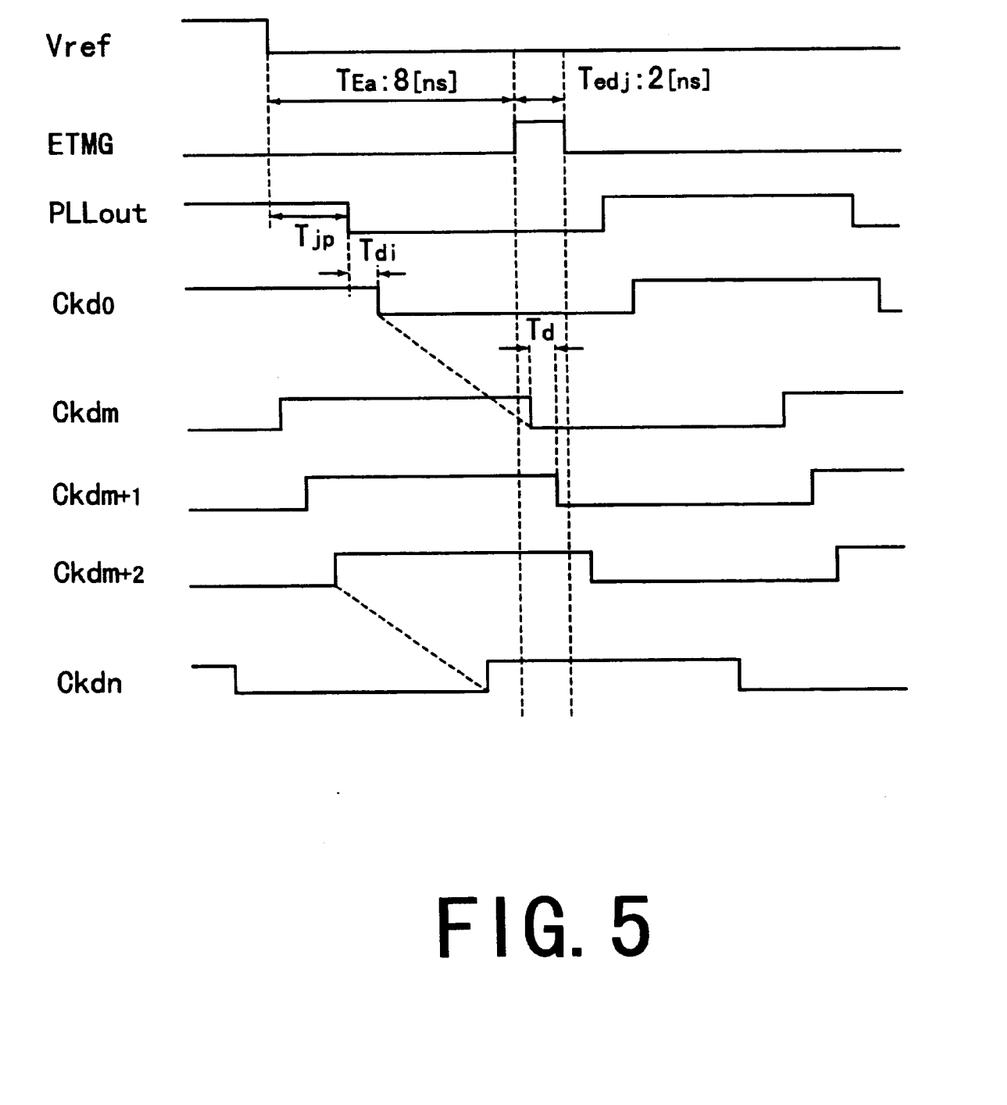
FIGS. 5 and 6 show operation waveforms in the jitter correction circuit described in FIG. 4.
Figure 6:
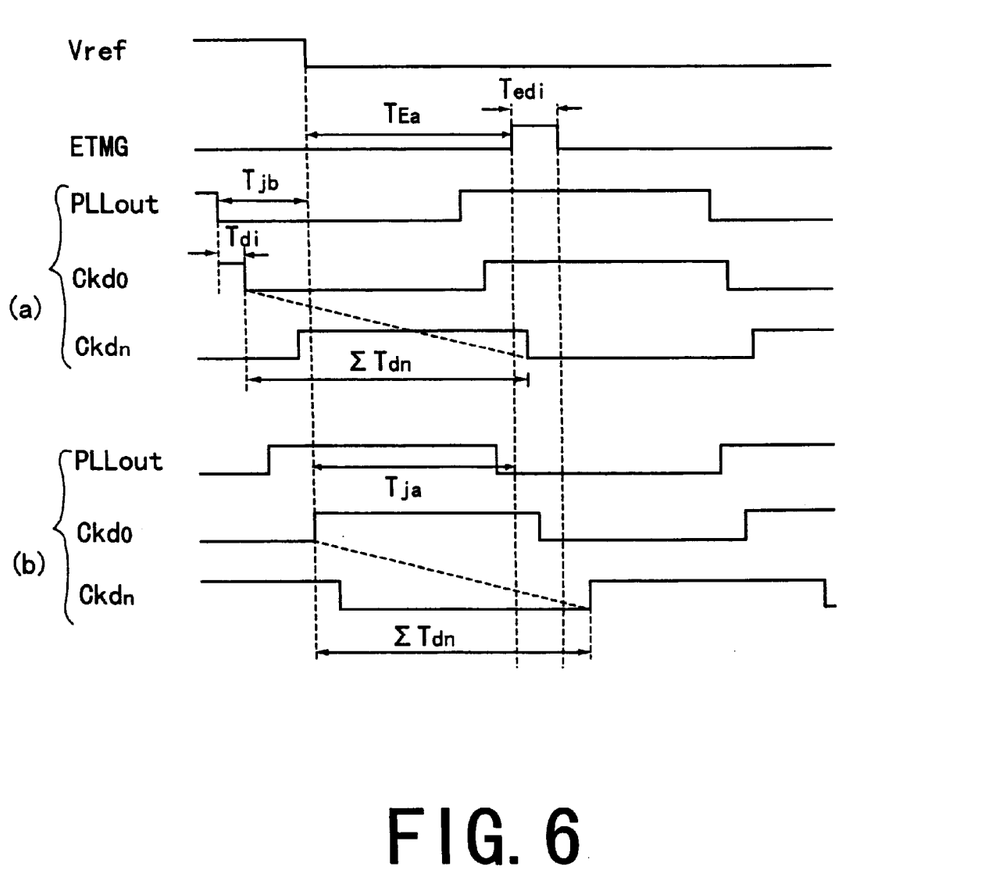

In the example shown in FIG. 5, the edge detection circuits Edm and Edm+1 output "1" for the delayed signals Ckdm and Ckdm+1, respectively. The other edge detection circuits Ed0, Ed1, . . . , Edn output "0".

The decoder DEC outputs signals of the edge detection circuits Ed0 through Edn during the edge detection period Tedj set by the output signal ETMG of the edge detection period setting circuit TM and holds the decoded results. The selector SEL selects one of the signal Ckd0 and the delayed signals Ckd1 through Ckdn in accordance with the decoded results.

Since the delay time in each of the delayed signals Ckd1 through Ckdn is 1 [ns] and the edge detection period Tedj set by the edge detection period setting circuit Tm is 2 [ns], two of the edge detection circuits Ed0 through Edn may output signals of "1". According to this embodiment, the circuit structure is made to select one timing of the signal Ckd0 and the delayed signal Ckd1 through Ckdn corresponding to the latest output signals of "1" of the edge detection circuits Ed0 through Edn. In the example shown in FIG. 5, the selector SEL selects timing of the delayed signal Ckdm+1 because the edge detection circuit Edm+1 generates the latest output signal of "1".

The selection rule of the selector circuit SEL is not always limited to this embodiment. The selector circuit SEL may select one of the signal Ckd0 and the delayed signals Ckd1 through Ckdn in accordance with the earliest output of "1" from the edge detection circuits Ed0 through Edn.

In this way, even in the case that the signal Ckd0 randomly includes jitters with a period between −8 [ns] and +10 [ns] with respect to the leading edge timing of the reference signal, the selector circuit SEL can provide an output which suppresses the jitter within about 2 [ns].

The selector circuit SEL selectively provides an output in which jitters are corrected within a predetermined range but the output inevitably contains a phase shift. In this embodiment, however, the output signal of the selector circuit SEL is further supplied to a timing adjustment circuit so that an operator may adjust the phase shift. This timing adjustment circuit is with (i) delay elements Fd'1 thorough Fd'i to delay the output signal of the selector circuit SEL. Each of the delay elements Fd'1 through Fd'i has delay time of 1 [ns], for instances. The delay element Fd'1 delays the output signals of the selector circuit SEL while the delay elements Fd'2 through Fd'i delay the outputs of the previous delay elements Fd'1 through Fd' (i−1), respectively. The output signals of the selector circuit SEL and the delay elements Fd'1 through Fd'i are supplied to a multiplexor MPX. The multiplexor MPX has an outer setting terminal to which one of input signals selected by an operator is supplied as the reconstructed dot clock signal. The number of the delay elements is determined in view of delay time for each delay element, and jitter quantity and a repetition period of the correction subject signal. In this particular embodiment, it is set to be 15.

Thus, the jitter-corrected output signal of the selector circuit SEL is further adjusted with respect to its phase by the timing adjustment circuit and is outputted as the reconstructed dot clock signal RCK.

The delay elements Fd1 through Fdn with the same delay time are serially connected to generate the delayed signals Ckd1 through Ckdn with mutually different timing. A plurality of delay elements with mutually different delay time may be connected in parallel with each other to obtain substantially the same effect as in the present embodiment.

According to the present embodiment, the number of the delay element with the delay time of 1 [ns] is 15 and the edge detection period Tedj is set to be 2 [ns]. Where the number of the delay elements and the edge detection period Tedj, however, are increased, those arrangements can correct jitters distributed in a much wider range with respect to the trailing edge timing of the reference signal Vref. It may also be acceptable to detect leading edges of the correction subject signal Ckd0 and the delayed signals Ckd1 through Ckdn.

Timing setting according to this embodiment will be explained in detail with reference to FIG. 6. Reference legend (a) shows the case that the output signal PLLout of the PLL circuit 271 is advanced in phase with respect to the reference signal Vref while the legend (b) indicates the case that the output signal PLLout is delayed in phase.

In order to process all the phase shifts, one output signal of the signal Ckd0 and the delayed signals Ckd1 through Ckdn should be detected during the edge detection period Tedj. Where the total delay time $\Sigma Td$ results from all the delay elements Fd1 through Fdn, the output signal PLLout of the PLL circuit 271 has delay time due to the buffer circuit and the like, shifted time Tjb are defined as in the earliest case of phase shifts in the output signal PLLout, and shifted time Tja is defined as in the latest case of phase shifts therein, the total delay time $\Sigma Td$ should be satisfied with the following equation:

$$\Sigma Td > (Tjb-Tji)+(Tja+Tji)=(Tja+Tjb)$$

Further, the number of the delay elements (n) is set to be 15 in this embodiment so that the total delay time $\Sigma Td$ may be much longer than the maximum phase shift time in the PLL circuit 271. The jitter detection period Tedg is then also selected consistent with the total amount of delays $\Sigma Td$ to be longer than the maximum possible phase shift in the PLL circuit 271. The number of the delay elements is determined in accordance with performance of the PLL circuit.

It is also necessary to choose one of the signal Ckd0 and the delayed signals Ckd0 through Ckdn within the edge detection period Tedj. Thus, where a setting-up period Setup (Ed) and a holding period Hold (Ed) are designed for each edge detection circuits Ed0 through Edn, and each of the delay elements Fd0 through Fdn is provided with the delay time Td, the edge detection period Tedj is given by the following equation:

$$Tedj > \text{Setup } (Ed) + \text{Hold } (Ed) + Td$$

The edge detection period Tedj in this embodiment is 2 [ns] to satisfy the condition set forth above.

A period of time TEa from the trailing edge of the reference signal Vref through the leading edge of the output signal ETMG can be expressed by the following equation:

$$TEa < Tja+Tdi-\text{Setup } (Ed) \quad TEa > Tja+Tdi+\text{Hold } (Ed)-Tedj$$

According to this embodiment, the period TEa is 8 [ns] to satisfy the above-mentioned condition. This period TEa is set in the case that the trailing edge of the reference signal Vref is detected but may be appropriately changed in accordance with the period of the signal Ckdo. It is also set, for example, in the case that the leading edge of the reference signal Vref is detected.

Where the delay Td of each of the delay elements is set to be much shorter and the edge detection circuit is provided with higher speed circuit elements in which the setting-up period Set up (Ed), i.e., a time period during which a circuit receives and holds an input data until and unless any change of a control input takes place and the holding period Hold (Ed), i.e., a time period during which a circuit holds an input data even after any change of a control input are shorter, the correction accuracy thereof is improved but an increase of power consumption and other problems arise.

The inventors of this patent application have experimentally confirmed that sufficient display dignity can be obtained from the present embodiment in the case that jitter quantity is less than 3 [ns] for the XGA specification and the delay time of each delay element is less than 2 [ns]. They have also confirmed that sufficient display dignity can also obtained from the embodiment where the former is less than 1 [ns] for the SXGA specification while the latter is less than 0.5 [ns].

Next, a liquid crystal display device according to a second embodiment of the present invention will be explained hereinafter. This liquid crystal display device is substantially the same in construction as in the first embodiment except the jitter correction circuit 281 shown in FIG. 7. Thus, the same members in both embodiments have the common reference numbers and/or legends and the explanation thereof in detail is omitted for simplicity.

Figure 7:
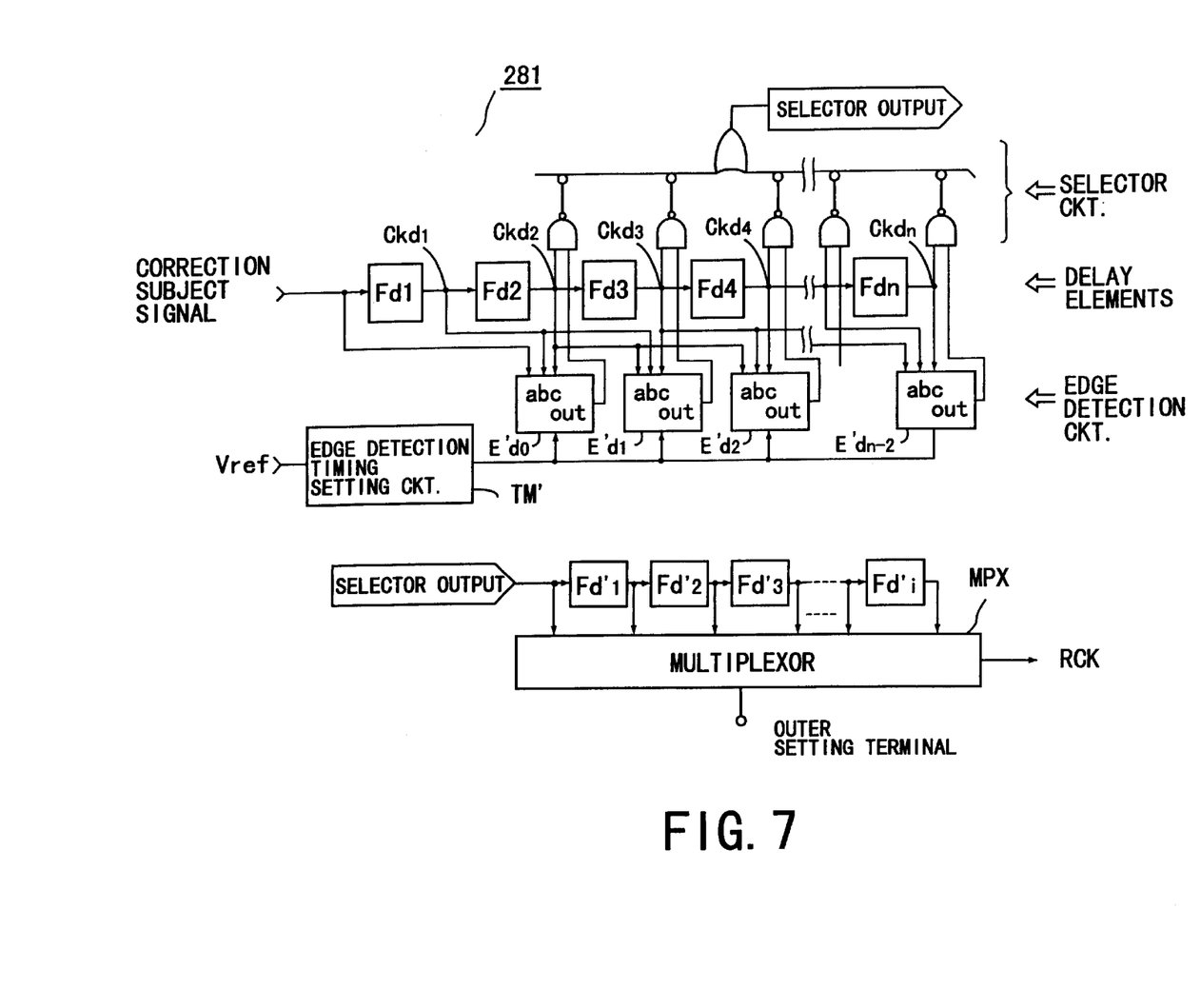
FIG. 7 shows a circuit diagram of a jitter correction circuit for a liquid crystal display device according to a second embodiment of the present invention.

As in the first embodiment, the output signal PLLout of the PLL circuit 271 is outputted through a buffer circuit (not shown) as the reconstructed dot clock signal R'CK which, in turn, is applied to the jitter correction circuit 281 as the correction subject signal Ckd0. The jitter correction circuit 281 is provided with (n) delay elements Fd1 through Fdn, (n+1) edge detection circuits Ed0 through Edn, a selector SEL, and a timing adjustment circuit.

The delay elements Fd1 through Fdn are connected in series to delay the signal Ck0 successively. The delay elements Fd1 through Fdn delay the signal Ckd0 and the following delayed signals by the delay time Td of 0.5 [ns], respectively. Time lags between the signal Ckd0 and each of the delay elements Fd1 through Fdn are 0.5, 1, 1.5, ..., n/2 [ns]. The number of the delay elements is set to be 192, for instance.

The edge detection timing setting circuit TM' generates the output signal ETMG for determination of edge detection timing in accordance with the horizontal synchronization signal Hsync supplied thereto as the reference signal Vref. The output signal ETMG of the edge detection timing setting circuit TM' has a leading edge at the timing of 3 [ns] after the trailing edge of the reference signal Vref. In this embodiment, the reference signal Vref of the edge detection timing setting circuit TM' may be other than the horizontal synchronization signal, e.g., the vertical synchronization signal.

The edge detection circuit Ed0 receives the signal Ck0, and the delayed signals Ckd1 and Ckd2 as first, second and third input signals, respectively. Similarly, the edge detection circuits Edm, (m=1, 2, 3, ..., n) receives the delayed signals Ckdm, Ckdm+1, and Ckdm+2, as first, second and third input signals. The edge detection circuit Edn-2, for instance, receives the delayed signals Ckdn-2, Ckdn-1 and Ckdn as first, second and third input signals.

The edge detection circuits Ed0 through Edn-2 operate in the following way. The output signal ETFAG of the edge detection timing setting circuit TM' is high in level in the case where the delayed signals Ckdm+1 and Ckdm+2 are low and high in level, respectively, i.e., in the case of the existence of a leading edge between the delayed signals Ckdm+1 and Ckdm+2.

Figure 8:
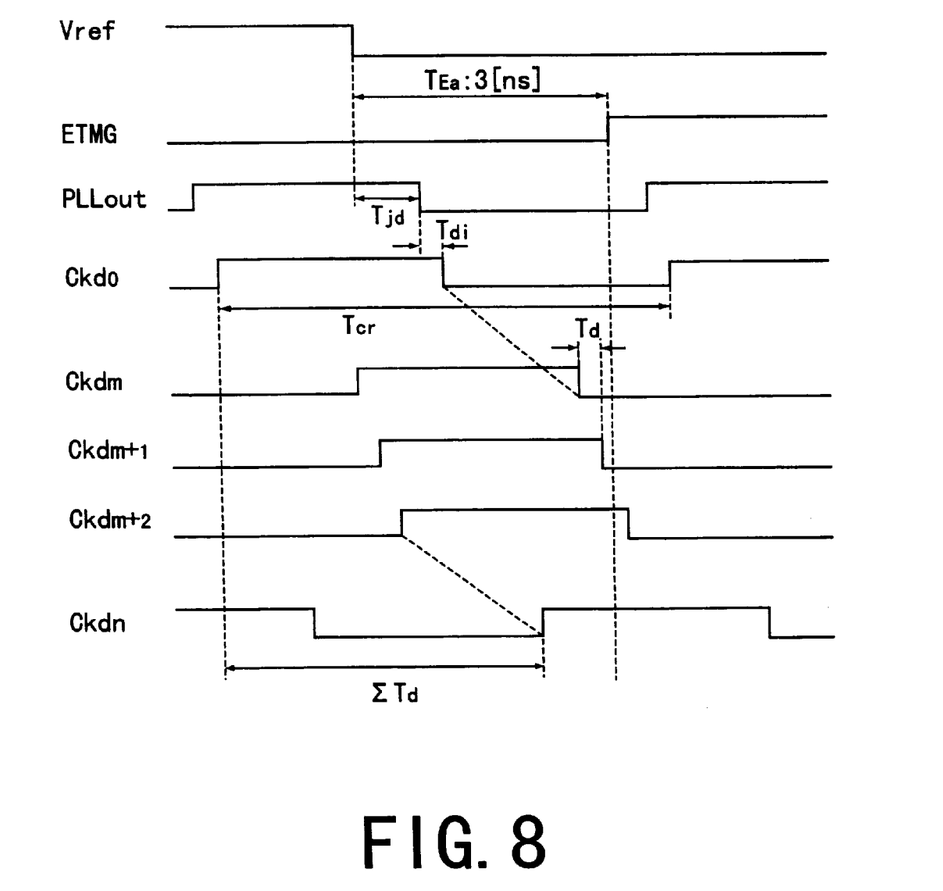
FIG. 8 indicates operation waveforms in the jitter correction circuit shown in FIGS. 7.

The selector circuit SEL selectively outputs one of the delayed signals Ckd2 and Ckdn, the trailing edge of which is detected in the earliest timing. The signal synchronizing with the trailing edge timing of the delayed signal Ckdm+2 corresponding to the delayed signal Fdm+2, for instance, is outputted in the case shown in FIG. 8.

According to the jitter correction circuit 281 of the second embodiment, even in the event that jitters exist randomly between −3 [ns] and +93 [ns], the trailing edge of the reconstructed dot clock signal R'CK supplied from the PLL circuit PLL as the signal Ck0 can suppress the jitters within about 1 [ns].

Although the number of the delay elements Fd1 through Fdn, each of which has the delay time of 0.5 [ns], is 192, the total delay time ΣTd may be longer than a period Tor which is the longest in the correction subject signal Ckdo. Where the delay time Td is shorter, the correction accuracy can be more improved. Those factors, however, should be determined properly in accordance with technical specifications, power consumption and the like as in the first embodiment.

The output signal of the selector circuit is provided to the timing adjustment circuit as in the first embodiment. The timing adjustment circuit is provided with serially connected delay elements Fd'1 through Fd'i to delay the output signals of the selector circuit SEL and the previous delay elements Fd'1 through Fd'(i−1), respectively. Delay time of each of the delay elements Fd'1 through Fd'i is 1 [ns], for example. The output signals of the selector circuit SEL and the delay elements Fd'1 through Fd'i are provided to the multiplexor MPX. The multiplexor MPX selectively outputs one of the input signals as the reconstructed dot clock signal to the outer terminal in responsive to the selection signal. The number of the delay elements Fd'1 through Fd'i is 15, for instance, in this case.

Although the delay elements with the same delay time are provided in series to generate a plurality of different timing delay signals, delay elements with different delay time may be connected in parallel with each other to obtain substantially the same effect as in this case.

A dot clock reconstruction circuit is provided only with a PLL circuit as in a jitter correction circuit of a prior art display device, the output signal of the PLL circuit is directly used for a sampling clock signal. Where stripe like images are displayed on a screen of the prior art display device, improper display situations like flickers and waving are observed significantly thereon.

According to the first and second embodiments of the present invention, where approximately 10 [ns] jitters are contained in the reconstructed dot clock signal R'CK, they can be suppressed to approximately 1 [ns] jitters in the reconstructed dot clock signal RCK obtained from the jitter correction circuit 281. Thus, timing of the reconstructed dot clock signal RCK is adjusted in the jitter correction circuit 281 so that good high contrast display images can be displayed without unevenness like flickers and waving.

As described above, in the jitter correction circuit of the present invention, the delay elements generate a plurality of delayed signals from a correction subject signal, one of them is selected on the condition with respect to the reference signal. Even in the event that the phase of the correction subject signal varies due to jitters, the selection result does not directly reflects the phase variation. This makes sampling timing proper in the case that the video signal is sampled in synchronization with the signal corresponding to the selection result. It is also possible to convert the video signal voltage in every pixel into pixel data correctly. The jitter correction circuit of the present invention can solve unstable image display caused by jitters.

What we claim is:

1. A jitter correction circuit comprising:
   a jitter detection period setting circuit to generate a jitter detection signal at a timing offset relative to an edge of a reference signal and to set a jitter detection period of said detection signal relative to said reference signal;
   a delayed signal generator to receive a correction subject signal and to generate a plurality of delayed signals of said correction subject signal in which,
   (a) the total delay time of said plurality of delayed signals of said correction subject signal is substantially shorter than a repetition period of said reference signal and greater than a total possible variation in phase of the correction subject signal, and
   (b) the time duration of the jitter detection period is greater than a delay introduced between each of said delayed signals and shorter than the total delay time of the delayed signals;
   an edge detection circuit to detect from said delayed signals of said correction subject signal any of delayed signals having an edge occurring during said jitter detection period; and
   an output circuit to output said correction subject signal corrected in accordance with detection by said edge detection circuit of the delayed signals having an edge occurring during the jitter detection period.

2. The jitter correction circuit according to claim 1, wherein said delayed signal generator has a plurality of delay elements connected serially to delay the correction subject signal successively.

3. The jitter correction circuit according to claim 1, wherein the correction subject signal is a horizontal dot clock signal in a display system.

4. The jitter correction circuit according to claim 3, wherein said horizontal dot clock signal is generated by multiplying a horizontal or vertical synchronization signal in a display 5. The jitter correction circuit according to claim 3, further including a phase locked loop circuit which multiplies a horizontal or vertical synchronization signal in a display system to generate said horizontal dot clock signal.

6. The jitter correction circuit according to claim 3, wherein said jitter detection period is set with respect to a horizontal or vertical synchronization signal in a display system.

7. The jitter correction circuit according to claim 1, wherein said output circuit includes a selector circuit to select at least one of said delayed signals in response to a detection result obtained from said jitter detection circuit.

8. The jitter correction circuit according to claim 7, wherein said output circuit is further provided with a timing adjustment circuit to adjust output timing of said selector circuit.

9. The jitter correction circuit according to claim 1, wherein each of said plurality of delayed signal generator delays said correction subject signal by predetermined delay time, said total delay time is determined by advancing and delaying phases of said correction subject signal, and said jitter detection period is greater than a sum of a setting-up time of said jitter detection circuit, a holding time thereof and said predetermined delay time.

10. The jitter correction circuit of claim 1, further comprising:
    a timing adjustment circuit coupled to the output circuit and configured to adjust a phase of the correction subject signal output by the output circuit.

11. The jitter correction circuit of claim 10, wherein the timing adjustment circuit comprises:
    plural delay elements connected in series, wherein a first delay element is coupled to the output of the output circuit; and
    a multiplexer having plural inputs coupled to respective outputs of said plural delay elements connected to series and configured to select one of said outputs of said plural delay elements connected in series.

* * * * *